United States Patent [19]

Ohsawa et al.

[11] 4,365,326
[45] Dec. 21, 1982

[54] RECORD PLAYER

[75] Inventors: Mitsuo Ohsawa, Kanagawa; Hiroshi Nakazawa, Saitama, both of Japan

[73] Assignee: Sony Corporation, Tokyo, Japan

[21] Appl. No.: 224,920

[22] Filed: Jan. 14, 1981

[30] Foreign Application Priority Data

Jan. 22, 1980 [JP] Japan ................................. 55-6226

[51] Int. Cl.³ ............................................. G11B 19/22
[52] U.S. Cl. ................................................... 369/268
[58] Field of Search ........................................ 369/268

[56] References Cited

U.S. PATENT DOCUMENTS 3,561,769  2/1971  Boynton et al. ................... 369/268

Primary Examiner—Steven L. Stephan
Attorney, Agent, or Firm—Hill, Van Santen, Steadman, Chiara & Simpson

[57] ABSTRACT

A record player has a turntable, a drive means to turn the turntable, a position detecting means for detecting the rotational position of the turntable and a stopping means for stopping the turntable. The stopping means is operated by a detecting output from the position detecting means so as to stop the turntable at a predetermined position.

6 Claims, 9 Drawing Figures

RECORD PLAYER

BACKGROUND OF THE INVENTION

1. Field of the Invention

This invention relates to a record player and particularly to a record player in which a label attached to a record disk can be viewed always at a predetermined position.

2. Description of the Prior Art

Generally, a record disk has a label attached on the central portion thereof on which various information including contents of the record disk such as a program, composer, lyric writer, performer, etc. and rotational frequency are inscribed. When recorded sound grooves of several programs for example are formed on one side of one sheet of the record disk and a desired one of these programs is to be played and heard, a cartridge is shifted down on the desired sound groove portion by reading where said program is from the first on the label.

While the label on the record disk is inscribed such that the upper and lower and left and right positional relationships between the programs are set at predetermined positions, a plurality of inscribed information groups can be rapidly and properly read when it is positioned properly to an operator with respect to the upper and lower relationship, but can not be conveniently read when such relationships are reversed or deviated left or right.

In the prior art record players, a turntable is usually interlocked with a vertical operation of a tone arm in an arm rest position to start and stop, and rotate also, for example, during the period of lead-in and lead-out operations of the tone arm aside from the period of actual playing operation the pick-up cartridge. Consequently, during such period the user can not read the inscribed contents on the label of the record disk. In addition, the turntable on which the record disk is mounted to be rotated does stop its rotation at a predetermined position. Hence, when one program is completely played and successively a desired one among several programs in the same record disk is selected to be played, the label may stop at a position upside down or directed sidewards so that it is difficult to read the inscribed contents under various set conditions of the label at every stoppage of the turntable.

However, when a short time after the completion of play of a program the play of the next one is successively started, for example, when the operator selects and operates to play a program according to the request of a listener, it is desirable to readily read the inscribed contents on the label to permit the next requested program to be played as soon as the turntable is stopped after the completion of the play of a program, i.e. the rotation of the record disk is stopped.

If too much time is taken to read and select a desired one of several programs recorded in the same surface of the same record disk, a loss time between played programs is elongated so that the several programs can not be smoothly and successively played.

SUMMARY OF THE INVENTION

An object of the present invention is to provide a record player which removes defects of prior record players.

Another object of the present invention is to provide a record player in which the label on a record disk always stops at the same position as that of initial play to permit the inscribed contents on the label to be readily read when the play of the record disk is completed or the rotation of the record disk is stopped to interrupt the play which is to follow.

Still another object of the present invention is to provide a record player in which the turntable is rotated with a constant speed only during actual playing operation such that the inscribed contents on the label of the record disk on the turntable can be read just before the user turns the disk, and so that he can also read said inscribed contents immediately after the completion of the playing operation.

A further object of the present invention is to provide a record player comprising a turntable on which a record disk is mounted, a rotary drive means for rotating said turntable with a constant speed, a stopping means for stopping the rotation of said turntable, a pick-up means for detecting record signals from said record disk, a vertically movable tone arm, a detecting means coupled with said turntable to detect the rotational position thereof and a means for indicating the completion of play of the record disk, characterized in that said stopping means is driven by the output of the indicating means and the output of said rotational position detecting means to stop said turntable at the target position.

The above and other objects, advantages and features of the present invention will become apparent from the following detailed description taken in conjunction with the drawings which indicate embodiments of the invention.

DESCRIPTION OF THE PREFERRED EMBODIMENTS

The present invention will be described in detail with reference to the drawings showing preferred and alternate embodiments.

Figure 1:
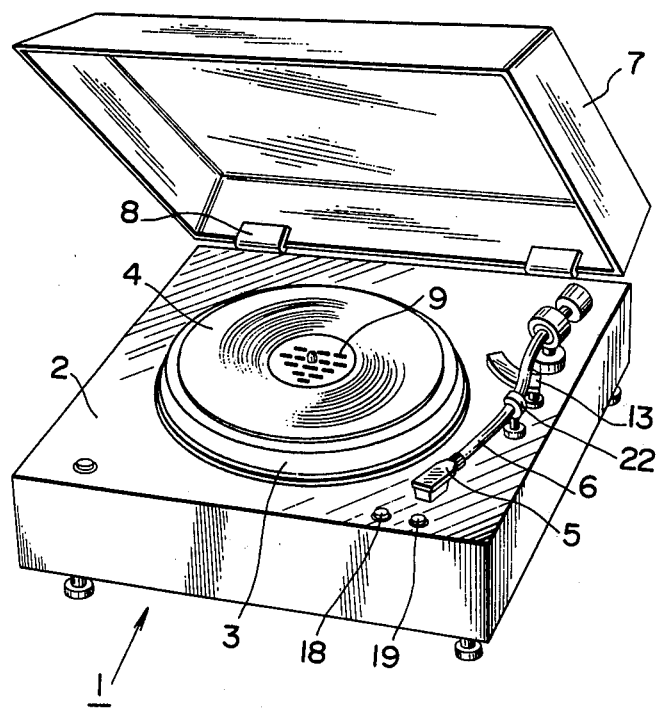
FIG. 1 is a perspective view of a record player according to the present invention.

FIG. 1 shows a perspective view of an embodiment of a record player according to the present invention. In this embodiment, a turntable 3 driven rotationally with a constant speed by a drive motor (not shown) and a tone arm 6 provided with a pick-up cartridge 5 for tracing a sound groove on a record disk 4 mounted on the turntable 3 are disposed on the upper panel 2 of a player body 1. A dust cover 7 is pivotably mounted on said player body 1 through a hinge 8 to cover said turntable 3 and tone arm 6. Usually in a record player constructed as above-described, the dust cover 7 is opened to put a record disk 4 on the turntable 3 from the front such that a label 9 can be easily read as shown in FIG. 1.

Also, to permit said turntable 3 to be rotated accurately at a predetermined speed, signals having a frequency synchronized with the rotation of the turntable 3 are obtained from a frequency generator 10 (see FIG. 3) and fed back to a motor drive circuit 11 to controllably drive a drive motor 12 through a speed feed-back servomechanism. For the frequency generator 10 for such a speed feed-back mechanism a magnetized body having a plurality of N and S poles recorded magnetically around the whole periphery of the turntable 3 is provided as a marker means. A magnetic sensor or one optically designed from a slip plate or reflecting plate formed with a slit-like signal pattern, a luminous element, and a light receiving element are also provided.

Further, while the tone arm 6 provided with said pick-up cartridge 5 is vertically operated by an arm lifter 13 disposed on the player body 1, the operational condition of the tone arm 6 is detected by an operational condition detecting circuit 14. For this circuit 14 a displacement detector magnetically constructed of a magnetizing body and magnetic sensor is used. Also, while the rotational angular position of said turntable 3 relative to the player body 1 is detected absolutely or relatively by a position detecting circuit 15, the turntable 13 is stopped at a predetermined position by a brake means 17 such as a electromagnetic brake operated by drive current from a brake drive circuit 16 controllably operated on the basis of the output signal of the detecting circuit 15.

Figure 2:
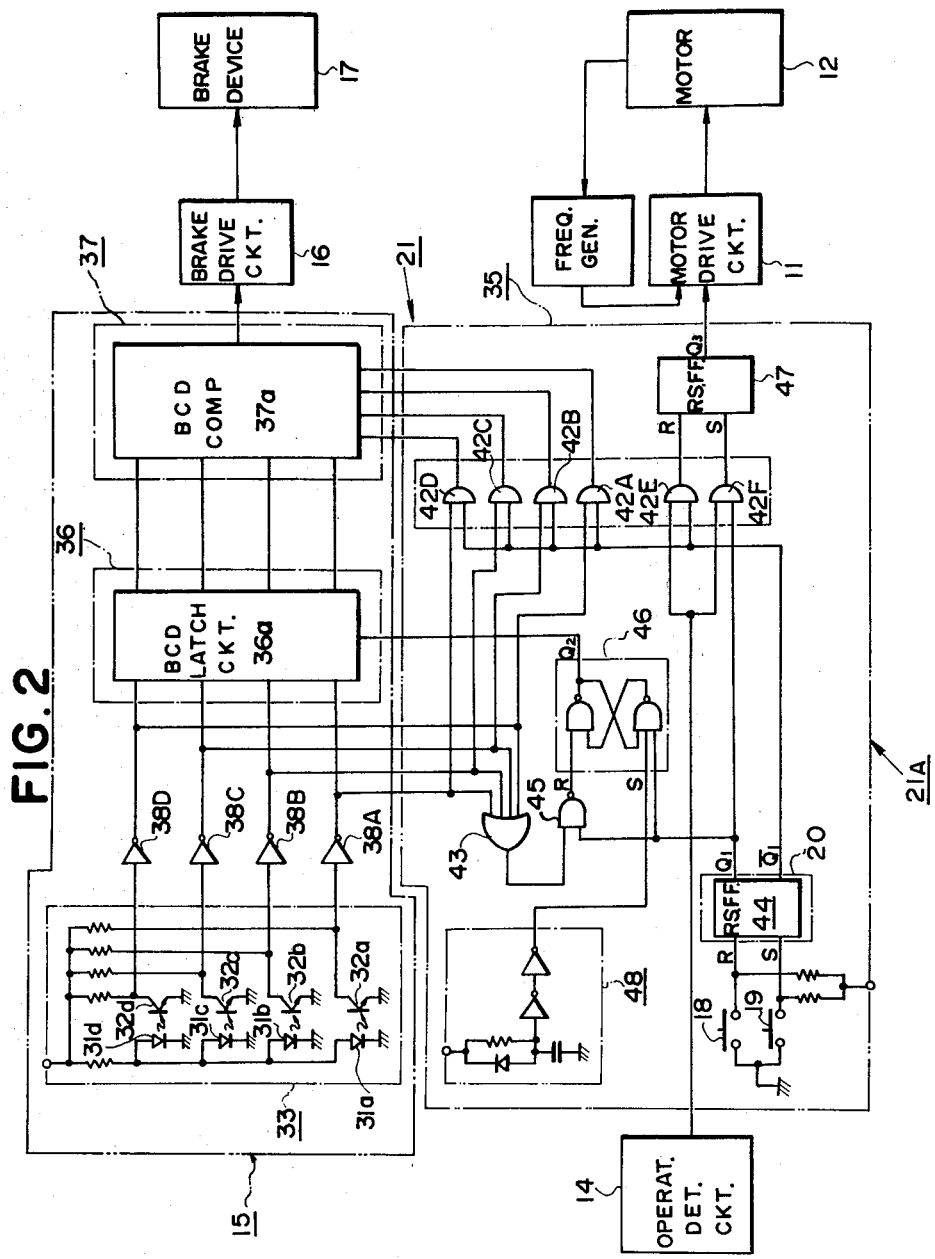
FIG. 2 is a block diagram showing a control circuit for a record player according to the present invention.
Figure 3:
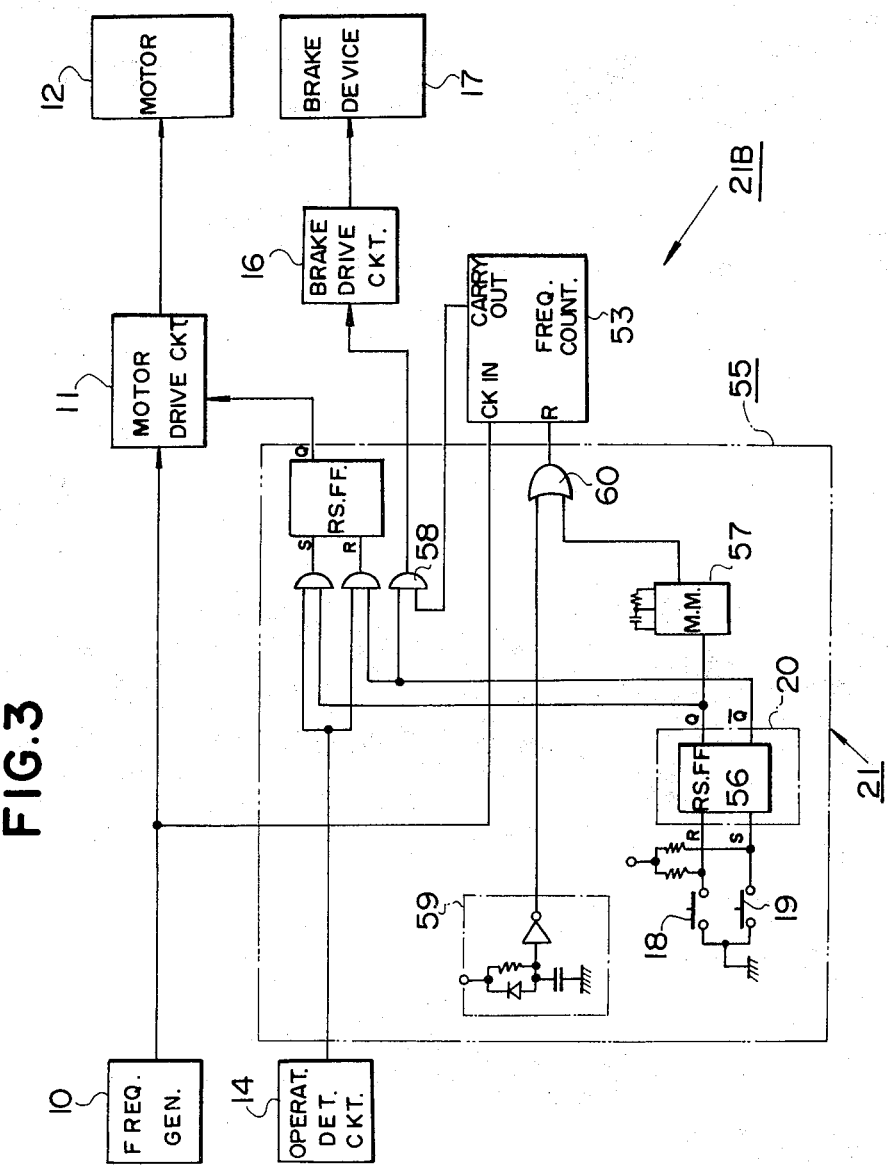
FIG. 3 is a block diagram showing another control circuit for a record player according to the present invention.

As shown in FIG. 2 or FIG. 3, the motor drive circuit 11 of the drive motor 12 for driving rotatably and stopping said turntable 3 and the brake circuit 16 for the brake means 17 are controllably operated by a control circuit 21 which carries out the operations described hereafter on the basis of command signals from a operation commanding circuit 20 operated in response to the operation of a start switch button 18 and stop switch button 19 arranged on the player body 1, detecting output signals from said condition detecting circuit 14, and detecting output signals from said position detecting circuit 15.

The operations carried out are as follows. The control circuit 21 starts the turntable 3 rotating by the drive motor 12 according to the detecting output signal from said condition detecting circuit 14 at the start of descent of said tone arm 6 when the playing operation is started on the basis of said operation commanding signals and respective detecting output signals. The turntable 3 is rotationally driven at a predetermined speed until the completion of descent of the tone arm 6. The operation of said drive motor 12 is stopped by the detecting output signal from said condition detecting circuit 14 at the ascent operation of said tone arm 6 in the completion of playing operation. The turntable 3 is then stopped at a predetermined position through the operation of said brake means 17 by the detecting output signal from said position detecting circuit 15.

Figure 4:
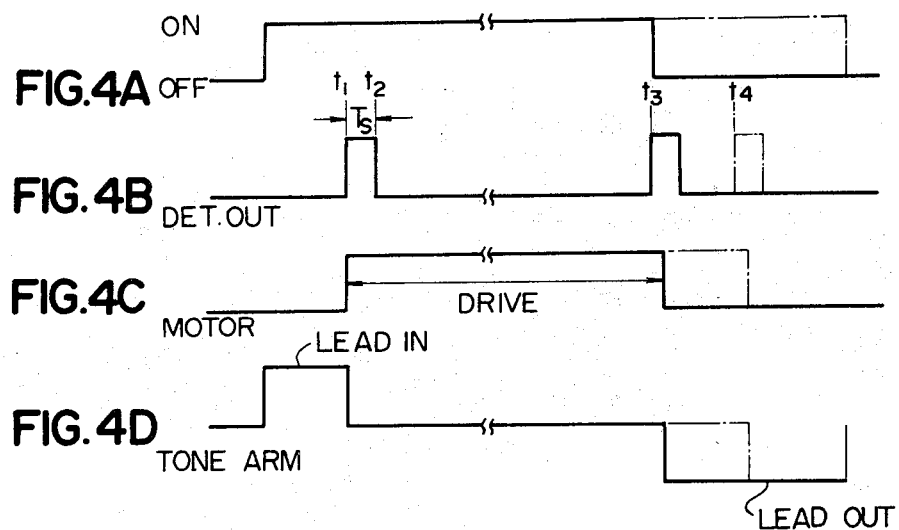
FIGS. 4A-4D are time charts for explaining the operation of the record player.

In the embodiment thus provided, as shown in FIG. 4A, when a lead-in operation is carried out in which the pick-up cartridge 5 is put down on a lead-in point in the beginning of playing operation after the operation of a start operation button 18 (FIG. 4D), the supply of drive current (see FIG. 4C) to the drive motor 12 is started by the motor drive circuit 11 at timing $t_1$ (see FIG. 4B). This occurs when the descent operation of said tone arm 6 is started by the detecting output signal from said condition detecting circuit 21. The turntable 3 is then driven rotationally at a predetermined speed during a period $T_S$ up to timing $t_2$ when the descent operation of said tone arm 6 is completed. Further, to permit the turntable 3 to be driven rotationally at a predetermined speed in a short time in such a manner, the drive motor 12 having large torque can be used. The sound groove on the record disk 4 mounted on the turntable 3 driven rotationally at said speed is traced by the pick-up cartridge 5 provided on the tone arm 6 for the playing operation. When the stop operation button 19 is operated during said playing operation to command the interruption thereof, the arm lift 13 is operated to lift the tone arm 6 while the supply of drive current from said motor drive circuit 11 to the drive motor 12 is stopped immediately at timing $t_3$. This occurs when said condition detecting circuit 14 detecting such ascent operation of the tone arm 6 sends the detecting output signal. At the same time the drive current from the brake drive circuit 16 is supplied to the brake means 17 and the basis of the detecting output signal from said position detecting circuit 15 to stop the turntable 3 at the predetermined position. Further, when the playing operation is continued up to the terminal of the sound groove on the record disk 4, an end detector not shown, automatically operates the arm lifter 13 to lift the tone arm 6 at timing $t_4$ when the end detector detects the completion of play. As the tone arm 6 is lifted, the rotation of the turntable 3 is stopped. Thereafter the tone arm 6 is returned to a position on an arm rest 22 by the lead-out operation.

Figure 5:
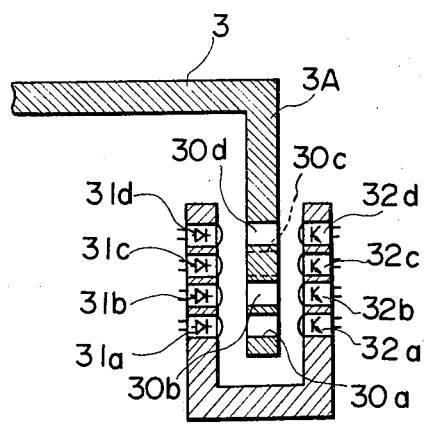
FIG. 5 is an enlarged sectional view of a turntable showing a position detecting means.

Hereafter will be described concrete embodiments of the position detecting circuit 15 and control circuit 21 for stopping said turntable at the predetermined position with reference to FIGS. 5–6. In these embodiments, the rotational angular position of turntable 3 to the player body 1 is detected by an absolute address for control. As shown in FIG. 5, said turntable 3 is formed on the peripheral flange portion 3A with four rows of slits 30a, 30b, 30c and 30d showing marker means as a four bit code pattern locating the rotational angular position at intervals of 360°/15 in absolute addresses. The code pattern based upon said slits 30a, 30b, 30c and 30d is adapted to be read by a code reader 33 consisting of four pairs of luminous diodes 31a, 31b, 31c and 31d and photo-transistors 32a, 32b, 32c and 32d which are respectively arranged opposed to each other and sandwiching said peripheral flange portion 3A.

Figure 6:
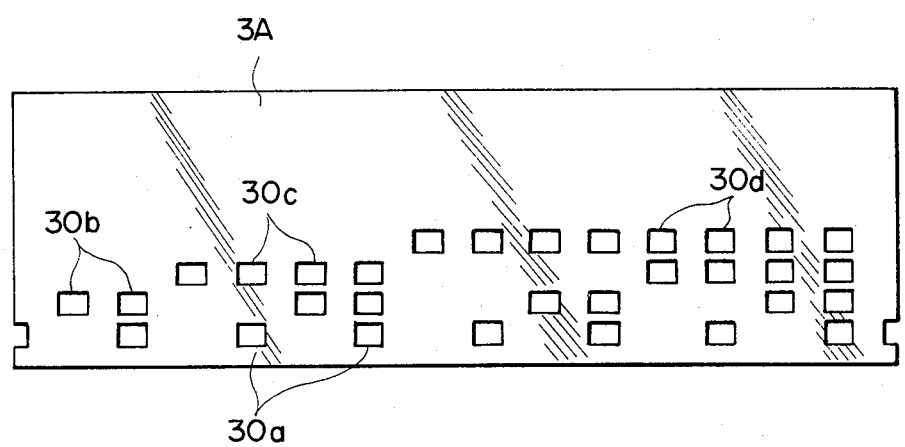
FIG. 6 is a development of a code board formed on the turntable.

For the code pattern based upon said slits 30a, 30b, 30c and 30d a code pattern showing "1"–"15" according to binary coded decimal notation code (BCD code) is shown in FIG. 6.

The code reader 33 for reading the code pattern based on said slits 30a, 30b, 30c and 30d is connected to a drive control circuit 21A designed as shown in FIG. 2 to supply four bit position data signals showing the present rotational angular position of said turntable 3 to a control block 35 and data storing block 36.

A data storing block 36 is provided for storing temporarily the position data signal of the rotational angular position in the beginning of the rotation of the turntable 3. A brake drive circuit 16 is provided for operating the brake means 17 according to the output signal from a data comparator block 37 which compares the position data signal stored in the data storing block 36 with the position data signal showing the present rotational angular position of the turntable 3. The control block 35 controls the respective operations of said data storing block 36 and data comparator block 37 as described hereafter:

The group of data input terminals in a four bit BCD latch circuit 36a constituting the data storing block 36 is parallel loaded with four bit position data signals obtained from the respective photo-transistors 32a,32b,32c and 32d forming said code reader 33. This data is loaded through inverters 38A,38B,38C and 38D. The four bit position data signals are supplied to a group of the respective one input terminals of four AND gates 42A,42B,42C and 42D constituting the control block 35 and a group of input terminals of four input OR gates 43. To the other input terminal group of the respective AND gates 42A,42B,42C and 42D of said control block 35 is supplied "not" output signal $\overline{Q}_1$ of a first R.S. flip-flop 44 which is set by the start signal commanding the start of rotation of the turntable 3 and the stop signal commanding the stop of same. Said first R.S. flip-flop 44 constitutes the operation commanding circuit 20. Furthermore, the respective output sinals $Q_1, \overline{Q}_1$ of said first R.S. flip-flop 44 carry out the gate control of other respective AND gates 42E,42F in said control block 35. Through these respective AND gates 42E,42F is supplied the detecting signal from the condition detecting circuit 14 to the set input terminal and reset input terminal of a third flip-flop 47 to control the operation of said motor drive circuit 11 by the output signal $Q_3$ from the third flip-flop 47. Also, said OR gate 43 supplies its gate output signal to the set input terminal of a second R.S. flip-flop 46 through a NAND gate 45 gate-controlled by the "yes" output signal $Q_1$ of said first R.S. flip-flop 44. To the reset input terminal of said second R.S. flip-flop 46 is supplied a not output signal $\overline{Q}_1$ from said first R.S. flip-flop 44 and the reset pulse from a pulse generator 48 for generating reset pulses when the power supply is put to work. The second R.S. flip-flop 46 supplies its "yes" output signal $Q_2$ to the control input terminal of said BCD latch circuit 36a to latch the position data signal showing the rotational position at the turntable 3 in the beginning of the rotation thereof on the BCD latch circuit 36a.

Also, each of said four AND gates 42A,42B,42C and 42D is opened by the "not" output signal $\overline{Q}_1$ of the first R.S. flip-flop 44 when the first R.S. flip-flop 44 is reset by the stop signal commanding the stop of rotation of the turntable 3. The one data input terminal group of four bit BCD comparator 37a constituting the data comparing block 37 is parallel-loaded with the position data signal showing the present rotational angular position of the turntable 3 from said code reader 33.

Also, at the other data input terminal group of said BCD comparator 37a the latch output data signal from said BCD latch circuit 36a is parallel-loaded to supply an output signal detecting the coincidence of the latch output data signal, i.e. the position data signal showing the start position of the turntable 3 with the present position data signal to the brake drive circuit 16 for operating the brake means 17 to stop the turntable 3.

The turntable 3 stopped in such a way is always stopped at the start position in which the rotation of the turntable is started. Thus the user can read the label and other information on the record disk 4 at the proper position.

Further, in the above-mentioned embodiment, the rotational angular position of the turntable is located at intervals of 360°/15. However, a more precise location may be determined by increasing the number of bits for the code pattern used. Also, instead of the optical code pattern according to said slits, the code pattern recorded magnetically may be detected by a magnetic head.

Also, to detect the rotational angular position of the turntable 3 relative to said player body 1 to controllably stop the turntable 3, a control circuit 21B constructed as shown in FIG. 3 may be used which utilizes frequency signals supplied from said frequency generator 10 and synchronized with the rotation of the turntable 3.

In the embodiment shown in FIG. 3, the drive control circuit 21B is provided with a frequency counter 53 for counting frequency signals from said frequency generator 10. A brake drive circuit 16 is also provided for driving the brake means 17. A control block 55 is employed for controlling the movement of said brake drive circuit 16 on the basis of carry output signals from said frequency counter 53. Said frequency counter 53 is a counter which counts to a number N corresponding to a predetermined frequency N generated by said frequency generator 10 per one revolution of the turntable 3 and supplies the carry output at intervals of the N count. Usually the frequency generator 10 in a record player generates the frequency signal of 512 waves per one revolution of the turntable 3 so that a 512 counter, i.e. 9 bit binary counter, can be used for said frequency counter 53. The control block 55 resets said frequency counter 53 according to the start signal commanding the start of rotation of the turntable 3 and supplies the carry output from said frequency counter 53 to the brake drive circuit 16 in response to the stop signal commanding the stoppage of the turntable 3. The control block 55 is constructed as follows. An R.S. flip-flop 56 is provided which is reset by the start signal and set by the stop signal. A monostable multivibrator 57 is triggered at every fall of a "yes" output signal Q from the R.S. flip-flop 56. An AND gate 58 is gate-controlled by a "not" output signal Q from said R.S. flip-flop 56. A pulse generator 59 generates reset pulses when the power supply is energized. An OR gate 60 supplies the reset pulse from the pulse generator 59 and the output signal from said monostable multivibrator 57 to the reset input terminal of said frequency counter 53.

In this embodiment provided with the above-mentioned brake drive control circuit 16, the frequency signals from the frequency generator 10 is counted by the frequency counter 53 reset in the beginning of rotation of the turntable 3 so that the rotational angular position of the turntable 3 is addressed by the relative address. That is, the rotational angular position of the turntable 3 in the beginning of the rotation is address 0. When the rotation of the turntable 3 is stopped, the brake drive circuit 16 is operated by the carry output supplied from said frequency counter 53 and which corresponds to the address 0 at every one revolution of the turntable 3 for the stoppage thereof. The turntable 3 stopped in this way is stopped at the same position as the rotational angular position in the beginning of the rotation of the turntable so that the label 9 on the record disk 4 will be always controllably stopped at the position in which the user can easily read the contents on the label 9. Also, in the above-mentioned embodiment, the position in which the turntable 3 is stopped is controlled by the utilization of a frequency signal from the frequency generator 10 provided for general record players so that the control for the stoppage of the turntable can be done by a very simple construction to provide very practical results.

As is apparent from the foregoing description of the respective embodiments, the desired objects of this invention are achieved by providing the record player according to the present invention wherein a turntable for mounting a record disk is provided together with a rotary drive means for rotating said turntable with a constant speed. A position detecting means detects the rotational position of said turntable. A stop means stops the rotation of said turntable and a pick-up detects the record signal from said record disk to operate said stop means according to the detecting output signal from said position detecting means for stopping said turntable at a predetermined position. Accordingly the user can properly read the inscribed contents on a label of the record disk on the turntable just before and after the play of the record disk.

It will be apparent to those skilled in the art that modifications and changes may be made in the illustrated embodiment without departure from inventive concepts manifested thereby. Accordingly it is expressly intended that the foregoing description of a preferred embodiment is not limiting.

We claim as our invention:

1. A record player, comprising: a turntable on which a record disk is mounted, marker means on said turntable representative of a plurality of angular positions thereof, a rotary drive means for rotating said turntable with a constant speed, a brake means for stopping the rotation of said turntable, a pick-up means for detecting record signals from said record disk, a vertically movable tone arm, a position detecting means coupled with said turntable to detect the rotational position thereof by sensing said marker means, a stop means for initiating a stopping of play of the record disk, start means for initiating a start of play of the record disk, the position detecting means including storage means for storing a market corresponding to a starting angular position of the turntable when the start means is activated, and said brake means being responsive to an output from said stop means and an output from said position detecting means so as to stop said turntable at said starting angular position.

2. A record player as defined in claim 1, wherein a frequency generator means is provided for generating signals of a predetermined frequency N per one revolution of the turntable based on a detection of a plurality of markers, and a N nomination counter means functioning as said storage means for counting the frequency from said generator means, said brake means being operated by a carry output signal from said N nomination counter means so as to stop said turntable at the starting angular position.

3. A record player as defined in claim 1, wherein said marker means comprises a code pattern provided on said turntable to indicate the rotational angular position thereof in absolute address, a code reader, and the position detecting means including means for reading said code pattern, said storage means storing temporarily address data read out by said code reader at the starting position, and a data comparator means for detecting a coincidence of the address data read out by said code reader in the stopping operation of the turntable with the address data stored temporarily in said storage means, and the brake means being operated by a coincidence detecting signal from the data comparator means to stop the turntable.

4. A record player as defined in claim 1, further comprising a means for detecting ascent and descent of said tone arm, the rotation of the turntable being started by the drive means according to an output signal from said position detecting means in the beginning of playing operation and descent operation of said tone arm to permit said turntable to be rotationally driven with a predetermined speed before the completion of descent operation of the tone arm, and the operation of said drive means being stopped by a detecting output signal from said detecting means when the playing operation is completed and the tone arm lifts.

5. A record player, comprsing: a turntable; drive means for rotating the turntable; brake means for selectively stopping rotation of the turntable; coding means on said turntable representative of a plurality of angular positions thereof; a tone arm with pick-up means associated therewith; code reader means for reading said coding means; turntable rotation start means and turntable rotation stop means; data storage means; comparator means; and circuit means for storing a start-up position coding in said storage means when the start means is activated and for comparing sensed coding in the comparing means with the stored coding in the storage means until coincidence is achieved and activating the brake means at a time of such coincidence corresponding to the angular start-up position of the turntable.

6. A record player, comprising: a turntable; marker means on said turntable; drive means for rotating the turntable; brake means for stopping rotation of the turntable; a tone arm with a pick-up associated therewith; a frequency generator whose frequency is determined by the marker means on the turntable; frequency counter means having a carry output; start means for initiating rotation of the turntable and stop means for initiating stopping of rotation of the turntable; and circuit means for initiating a count by the counter means of pulses from the frequency generator when the start means is activated, the carry output of the counter means providing a signal corresponding to the start-up angular position of the turntable for each rotation, and activating the brake means after the stop means is activated and when the carry output of the frequency counter indicates that the initial rotational angular position of the turntable occurs.

* * * * *